(12) United States Patent
Dwivedi et al.

(10) Patent No.: US 11,445,469 B2
(45) Date of Patent: Sep. 13, 2022

(54) METHOD, APPARATUS AND SYSTEM FOR DETERMINING A POSITION OF A WIRELESS DEVICE

(71) Applicant: Telefonaktiebolaget LM Ericsson (publ), Stockholm (SE)

(72) Inventors: Satyam Dwivedi, Solna (SE); Henrik Asplund, Stockholm (SE); Jonas Medbo, Uppsala (SE); Fredrik Gunnarsson, Linköping (SE); Ali Zaidi, Norrköping (SE); Sara Modarres Razavi, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 92 days.

(21) Appl. No.: 16/965,025

(22) PCT Filed: Feb. 9, 2018

(86) PCT No.: PCT/SE2018/050123
§ 371 (c)(1),
(2) Date: Jul. 27, 2020

(87) PCT Pub. No.: WO2019/156603
PCT Pub. Date: Aug. 15, 2019

(65) Prior Publication Data
US 2021/0112521 A1    Apr. 15, 2021

(51) Int. Cl.
*H04W 24/00* (2009.01)
*H04W 64/00* (2009.01)
(Continued)

(52) U.S. Cl.
CPC ....... *H04W 64/006* (2013.01); *G01S 5/02216* (2020.05); *H04L 5/0051* (2013.01);
(Continued)

(58) Field of Classification Search
CPC ............. H04W 64/006; H04W 56/001; H04W 56/0075; H04W 4/023; H04W 4/029;
(Continued)

(56) References Cited

U.S. PATENT DOCUMENTS 5,512,908 A * 4/1996 Herrick ............... G01S 5/12
                                                  342/451
5,600,706 A * 2/1997 Dunn ................. H04W 4/24
                                                  455/456.2
(Continued)

FOREIGN PATENT DOCUMENTS

| EP | 2943023 A1 | 11/2015 |
| WO | 2016089266 A1 | 6/2016 |
| WO | 2016155774 A1 | 10/2016 |

OTHER PUBLICATIONS

PCT International Search Report and Written Opinion dated Nov. 30, 2018 for International Application PCT/SE2018/050123, 9 pages.
(Continued)

Primary Examiner — Stephen M D Agosta
(74) Attorney, Agent, or Firm — Sage Patent Group

(57) ABSTRACT

Methods and apparatuses for determining a position of a wireless device in a wireless communication network are provided. The method includes obtaining a first sequence of Time Difference of Arrivals (TDOAs) at the wireless device of reference signals, which are transmitted by and used for synchronization of a first pair of network nodes; and determining, based on the first sequence of TDOAs, a first relative distance. The method also includes obtaining a second sequence of TDOAs at the wireless device of reference signals, which are transmitted by and used for synchronization of a second pair of network nodes; and determining, based on the first sequence of TDOAs, a second relative distance. The method further includes determining (Continued)

the position of the wireless device based on the first and second relative distances. Corresponding computer programs and computer program carriers are also disclosed.

8 Claims, 8 Drawing Sheets

(51) Int. Cl.
  *G01S 5/02* (2010.01)
  *H04L 5/00* (2006.01)
  *H04W 56/00* (2009.01)

(52) U.S. Cl.
  CPC ......... *H04L 5/0055* (2013.01); *H04W 56/001* (2013.01); *H04W 56/0075* (2013.01)

(58) Field of Classification Search
  CPC ....... H04W 64/00; H04W 4/02; H04W 24/10; H04W 4/025; G01S 5/02216; G01S 5/10; G01S 5/0215; G01S 5/0226; G01S 5/06; G01S 13/74; G01S 5/0273; G01S 5/12; G01S 5/021; G01S 5/0284; H04L 5/0041; H04L 5/0055; H04L 43/0864; H04L 27/261; H04L 27/2627; H04L 27/2657; H04L 27/2663; H04L 5/005; H04B 17/27; H04B 17/336; H04B 17/318; H04B 17/345; H04B 17/382; H04M 1/72412; H04M 1/72415; H04M 2250/10
  See application file for complete search history.

(56) References Cited

U.S. PATENT DOCUMENTS

| | | | | |
|---|---|---|---|---|
| 6,028,551 | A * | 2/2000 | Schoen | G01S 1/0428 342/357.37 |
| 6,204,812 | B1 * | 3/2001 | Fattouche | G01S 5/0009 342/457 |
| 6,230,018 | B1 | 5/2001 | Watters et al. | |
| 6,356,763 | B1 * | 3/2002 | Kangas | H04W 64/00 455/456.1 |
| 10,627,474 | B1 * | 4/2020 | Kratz | G01S 5/0221 |
| 2002/0086682 | A1 * | 7/2002 | Naghian | G01S 5/0273 455/456.1 |
| 2002/0183069 | A1 * | 12/2002 | Myr | H04W 64/00 701/515 |
| 2003/0176196 | A1 * | 9/2003 | Hall | G01S 5/0205 455/456.1 |
| 2003/0195008 | A1 * | 10/2003 | Mohi | G01S 19/42 701/519 |
| 2004/0102196 | A1 * | 5/2004 | Weckstrom | H04W 64/00 455/456.1 |
| 2005/0288033 | A1 * | 12/2005 | McNew | G01S 5/021 455/456.1 |
| 2006/0128399 | A1 * | 6/2006 | Duan | H04B 7/155 455/456.5 |
| 2008/0085699 | A1 * | 4/2008 | Hirano | H04W 24/02 455/414.2 |
| 2008/0231511 | A1 * | 9/2008 | Montuno | G01S 5/06 342/465 |
| 2009/0073039 | A1 * | 3/2009 | Rideout | G01S 19/27 342/357.31 |
| 2009/0167604 | A1 * | 7/2009 | Roberts | H04B 7/0617 342/368 |
| 2010/0238070 | A1 * | 9/2010 | Harper | G01S 19/46 342/357.46 |
| 2010/0238917 | A1 * | 9/2010 | Silverman | G01S 5/06 370/350 |
| 2010/0321239 | A1 * | 12/2010 | Rossi | G01S 5/0268 342/387 |
| 2010/0331012 | A1 | 12/2010 | Zhang | |
| 2012/0165012 | A1 * | 6/2012 | Fischer | G01S 5/10 455/435.1 |
| 2013/0310074 | A1 * | 11/2013 | Porzio | H04W 4/023 455/456.1 |
| 2013/0322214 | A1 * | 12/2013 | Neukirch | G01S 1/805 367/137 |
| 2014/0045522 | A1 * | 2/2014 | Sugar | G01S 5/0236 455/456.1 |
| 2014/0070942 | A1 * | 3/2014 | Haase | G08B 21/02 340/532 |
| 2015/0097653 | A1 * | 4/2015 | Gibbs | G01S 5/0278 340/10.1 |
| 2016/0054425 | A1 * | 2/2016 | Katz | G01S 3/14 342/417 |
| 2016/0134402 | A1 * | 5/2016 | Park | H04L 27/2663 370/329 |
| 2017/0102447 | A1 | 4/2017 | Choi et al. | |

OTHER PUBLICATIONS

Dwivedi, Satyam et al., "Joint Ranging and Clock Parameter Estimation by Wireless Round Trip Time Measurements", IEEE Journal on Selected Areas in Communications, vol. 33, No. 11, Nov. 2015, pp. 2379-2390.
3GPP TS 36.355 V14.1.0, Technical Specification Group Radio Access Network, "Evolved Universal Terrestrial Radio Access (E-UTRA) LTE Positioning Protocol (LPP)", (Release 14), Mar. 2017, Valbonne, France, 164 pages.
3GPP TS 25.305 V14.0.0, Technical Specification Group Radio Access Network, "Stage 2 Functional Specification of User Equipment (UE) Positioning in UTRAN", (Release 14), Mar. 2017, Valbonne, France, 95 pages.
Extended European Search Report dated Aug. 18, 2021 for European Patent Application No. 18904602.2, 7 pages.

* cited by examiner

_US 11,445,469 B2_

METHOD, APPARATUS AND SYSTEM FOR DETERMINING A POSITION OF A WIRELESS DEVICE

CROSS-REFERENCE TO RELATED APPLICATIONS

This application is a 35 U.S.C. § 371 national stage application for International Application No. PCT/SE2018/050123, entitled "A METHOD, APPARATUS AND SYSTEM FOR DETERMINING A POSITION OF A WIRELESS DEVICE", filed on Feb. 9, 2018, the disclosures and contents of which are hereby incorporated by reference in their entireties.

TECHNICAL FIELD

Embodiments herein relate to positioning of a wireless device. In particular, they relate to a method, a positioning node, a network node and a system for determining a position of a wireless device. Corresponding computer programs and computer program carriers are also disclosed.

BACKGROUND

Time and location are two basic elements of human cognition. Many future technologies will strive towards improving the information acquisition and control of these important cognitive parameters. Every fraction improvement in such efforts would lead to a plethora of life essential applications of future.

An architecture where a procedure for positioning in Long-Term Evolution (LTE) can be used is illustrated in FIG. 1, in which procedure a time of arrival (TOA) is measured based on clock information. Throughout this disclosure, the terms wireless device and User Equipment (UE) are used interchangeably.

FIG. 1 shows interactions between a UE 120 and a location server 130, in this case an Evolved Serving Mobile Location Center (E-SMLC) via, e.g., a LTE Positioning Protocol (LPP). The E-SMLC 130 is responsible for providing accurate assistance data and can perform the calculation of position if needed. The E-SMLC 130 may communicate with the UE 120 for providing location services and assistance data delivery using an LPP protocol.

Moreover, there are also interactions between the location server 130 and an eNodeB 110A, 110B, 110C or 110D via a LTE Positioning Protocol A (LPPa) protocol, to some extent supported by interactions between the eNodeB 110A, 110B, 110C or 110D and the UE 120 via an air interface or Uu interface using a Radio Resource Control (RRC) protocol.

FIG. 2 shows one RTT based on clock signals measured by a network node 110A when communicating with another network node 110B. Ideally, each network node is supposed to use the same clock reference. It means that two clocks in two network nodes are synchronized by having the same phase and frequency. In practice, different clocks are often used which are not completely synchronized due to either a different phase or a different frequency, which is called clock asynchronization. In this situation, in order to detect the clock asynchronization, two network nodes exchange signals based on their clock timings which occur with a regular clock cycle/period, as indicated by upward edges as shown in FIG. 2. The term "clock period" is used herein to represent the time between two adjacent upward edges. A network node 110A transmits a signal, which arrives at a network node 110B a time duration M earlier than the network node 110B's next clock cycle. The network node 110B waits for a preset number of its clock periods, in this case two clock periods, which is also called "delay in response" D, and then responds with a signal for acknowledging the receipt of the signal from the network node 110A. The respond signal from network node 110B travels a time duration d/c until it arrives at the network node 110A, wherein d is the distance between the two network node 110A and 110B, and c represents the speed of light. As indicated in FIG. 2, the network node 110B waits for two timing periods of its own clock. After receiving the response from the network node 110B, the network node 110A measures RTT between the transmitted and received signals, i.e., RTT=M+D+2 d/c.

If the RTT measurement made by the network node 110A is repeated over time, a sequence of RTT measurements is obtained, and follows a sawtooth wave form, which can be shown in a diagram as in FIG. 3. This wave form is due to the clock asynchronization, i.e. synchronization error, between the network node 110A and network node 110B. More details on how such a sawtooth is formed between two network nodes, can be found in an article, entitled "Joint Ranging and Clock Parameter Estimation by Wireless Round Trip Time Measurements", S. Dwivedi, A. De Angelis, D. Zachariah and P. Handel, IEEE Journal on Selected Areas in Communications, vol. 33, no. 11, pp. 2379-2390, November 2015.

Based on known positions of network nodes, such as eNBs, and their synchronous clocks, it is possible for the E-SMLC to estimate the UE position from the so-called Reference Signal Time Difference (RSTD) and covariance reports, using multilateration.

SUMMARY

It is therefore an object of embodiments herein to improve the positioning a wireless device.

According to a first aspect of embodiments herein, a method is performed by a positioning node for determining a position of a wireless device in a wireless communication network. The method comprises obtaining a first sequence of Time Difference of Arrivals, TDOAs, at the wireless device of reference signals, which are transmitted by and used for synchronization of a first pair of network nodes. The method comprises determining, based on the first sequence of TDOAs, a first relative distance $d_{2u}-d_{1u}$, which is a difference between distances from the wireless device to each network node in the first pair. The method also comprises obtaining a second sequence of TDOAs at the wireless device of reference signals, which are transmitted by and used for synchronization of a second pair of network nodes. The method comprises determining, based on the first sequence of TDOAs, a second relative distance $d_{4u}-d_{3u}$, which is a difference between distances from the wireless device to each network node in the second pair. The method further comprises determining the position of the wireless device based on the first and second relative distances $d_{2u}-d_{1u}$, $d_{4u}-d_{3u}$.

According to a second aspect of embodiments herein, a positioning node is arranged for determining a position of a wireless device in a wireless communication network. The positioning node is configured to obtain a first sequence of TDOAs, at the wireless device of reference signals, which are transmitted by and used for synchronization of a first pair of network nodes. The positioning node is configured to determine, based on the first sequence of TDOAs, a first relative distance $d_{2u}-d_{1u}$, which is a difference between distances from the wireless device to each network node in the first pair. The positioning node is also configured to obtain a second sequence of TDOAs at the wireless device of reference signals, which are transmitted by and used for synchronization of a second pair of network nodes. The positioning node is configured to determine, based on the first sequence of TDOAs, a second relative distance $d_{4u}-d_{3u}$, which is a difference between distances from the wireless device to each network node in the second pair. The positioning node is further configured to determine the position of the wireless device based on the first and second relative distances $d_{2u}-d_{1u}$, $d_{4u}-d_{3u}$.

According to a third aspect of embodiments herein, a method is performed by a network node in a wireless communication network for enabling a positioning node to determine a position of a wireless device. The method comprises transmitting a sequence of reference signals; and receiving a sequence of reference signals transmitted by another network node for acknowledging receipts of the reference signals transmitted by the network node. The reference signals are used for both enabling the positioning node to determine said position based on a sequence of TDOAs, of the reference signals at the wireless device and for synchronization between the two network nodes.

According to a fourth aspect of embodiments herein, a network node in a wireless communication network is arranged for enabling a positioning node to determine a position of a wireless device. The network node is configured to transmit a sequence of reference signals; and receive a sequence of reference signals transmitted by another network node for acknowledging receipts of the reference signals transmitted by the network node. The reference signals are used for both enabling the positioning node to determine said position based on a sequence of TDOAs, of the reference signals at the wireless device and for synchronization between the two network nodes.

According to a fifth aspect of embodiments herein, a wireless communication network is arranged for enabling a positioning node to determine a position of a wireless device in the wireless communication network. The wireless communication network comprises at least one of: a positioning node according to the second aspect of embodiments; and two pair of network nodes, wherein each pair comprises one network node according to the fourth aspect of embodiments.

According to a sixth aspect of embodiments herein, a computer program comprises instructions, which when executed by a positioning node, cause the network node to perform the method according to the above first aspect.

According to a seventh aspect of embodiments herein, a carrier comprises the computer program according to the above sixth aspect.

According to an eighth aspect of embodiments herein, a computer program comprises instructions, which when executed by a network node, cause the network node to perform the method according to the above third aspect.

According to a ninth aspect of embodiments herein, a carrier comprises the computer program according to the above eighth aspect.

Each carrier mentioned above may be any one of an electronic signal, an optical signal, an electromagnetic signal, a magnetic signal, an electric signal, a radio signal, a microwave signal, or a computer-readable storage medium.

By using the reference signals intended for clock synchronization also for positioning, an advantage is that simultaneous clock synchronization and positioning, based on the same sequences of reference signals, is achieved. A simple solution is therefore provided which does not require transmission of any additional signals exclusively for the positioning as such. The wireless device is a passive receiver node and does not need to transmit any signal, while achieving simultaneous clock synchronization and positioning. The embodiments herein are easy to implement on a network node and/or a wireless device. The embodiments herein can be applied in only a part of network, e.g., which has more severe clock synchronization issues.

BRIEF DESCRIPTION OF THE DRAWINGS

Examples of embodiments herein are described in more detail with reference to attached drawings in which.

DETAILED DESCRIPTION

As part of explaining embodiments herein, some problems will first be identified and shortly discussed.

In conventional Time Difference of Arrival (TDOA) based positioning in LTE, it is a problem that a complex UE is required with functionality to assist the positioning procedure by transmitting signals. The embodiments herein have the advantage of enabling use of a simplified UE. That is because only signal exchange among network nodes themselves is required herein, thereby the UE is just a passive receiver and does not need to transmit any signal. Additionally, another advantage is that the embodiments herein do not require transmission of any additional signals exclusively for the positioning purpose, because reference signals used for time synchronization are also used for positioning.

Namely, embodiments herein are proposed for executing joint clock synchronization and positioning. In other words, the reference signals used for clock synchronizing between two network nodes are also used for positioning of the wireless device by a positioning node. It is thus another advantage that the amount of transmitted signals can be reduced.

Additionally, another problem may be that the conventional positioning procedures of today may not be accurate enough so that the position of a UE cannot be determined with sufficient precision. The existing solutions have not been able to provide a precise clock synchronization to enable a precise TDOA based positioning. Precise TDOA based positioning requires sub-nano second precision in estimation of transmitted time from network nodes. Clock synchronization solutions require very high sampling frequency clocks if the clock frequency of the network node clocks is very high. As mentioned above, the clock asynchronization often happens. The clock asynchronization between two network nodes is one major source of error incurring an imprecise positioning based on TDOA. Some embodiments herein may further enable a more precise positioning, which is not affected by any clock asynchronization between network nodes. The clock asynchronization may also be referred to as a synchronization error, or a clock error herein.

Figure 1:
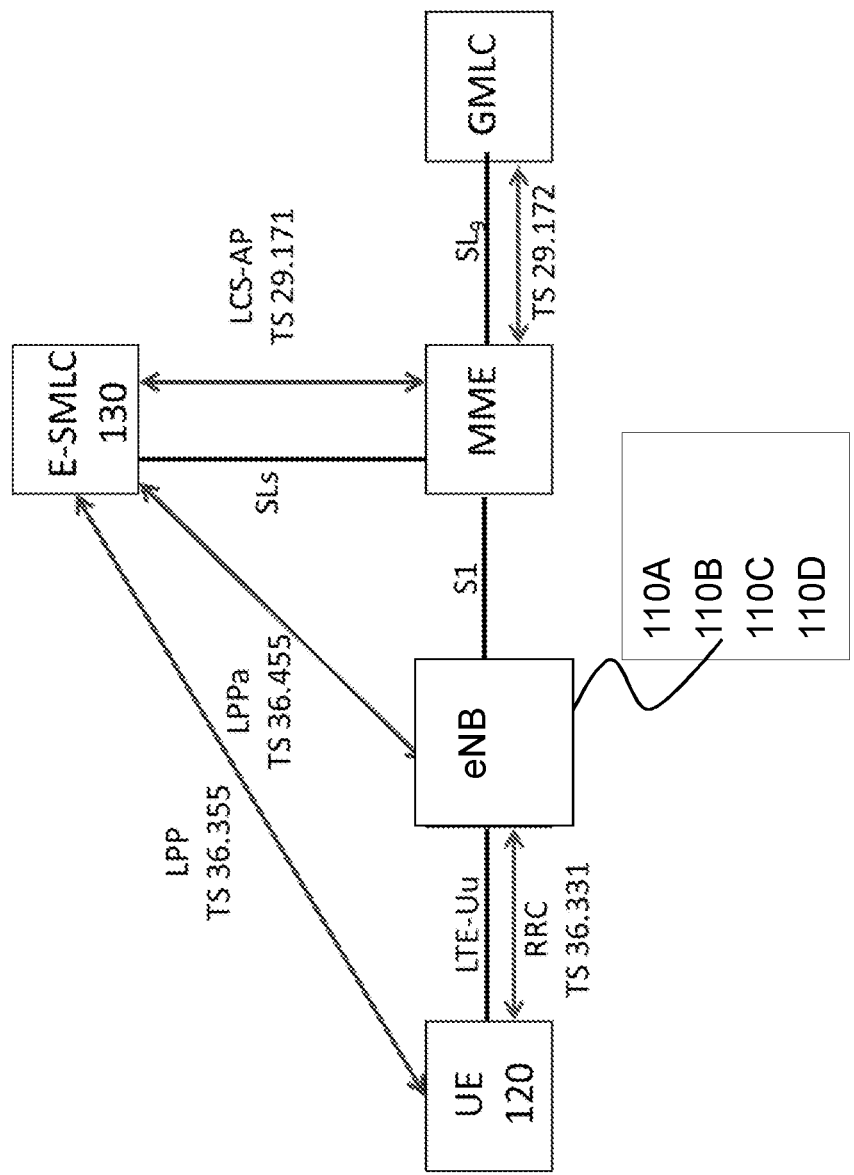
FIG. 1 is a schematic overview of an exemplifying system in which embodiments herein may be implemented.
Figure 2:
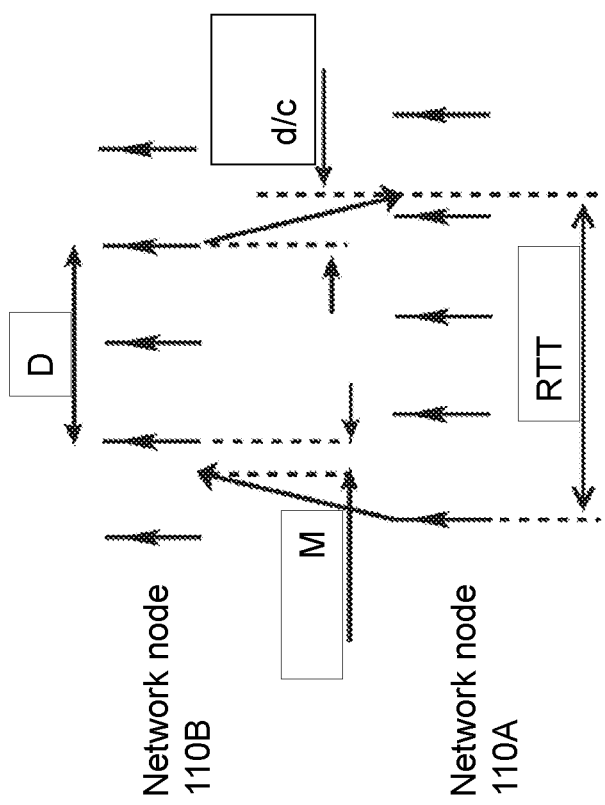
FIG. 2 illustrates a clock based RTT between two network nodes according to embodiments herein.
Figure 3:
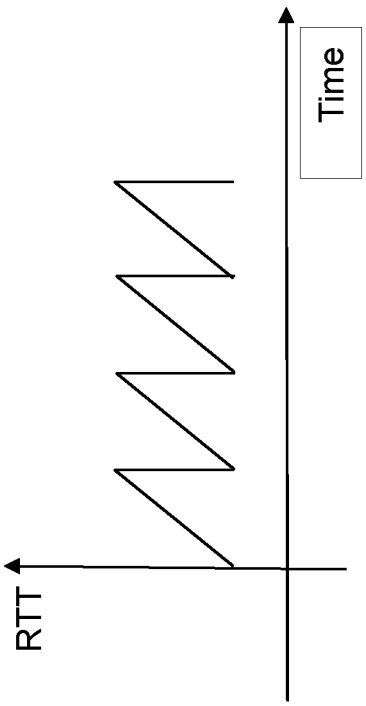
FIG. 3 illustrates a sequence of clock based RTTs between two network nodes according to embodiments herein.

FIG. 1 depicts an example of a communication network 100 in which embodiments herein may be implemented.

The embodiments herein are applicable to any wireless or wired communication technology, and not limited to LTE system, though the wireless LTE positioning architecture is illustrated as an example in FIG. 1.

In different alternatives of implementation, a positioning node as mentioned herein may be the wireless device 120 itself or some other node in the network used for positioning of wireless devices, e.g., a location server 130. The location server 130 may be an Enhanced Serving Mobile Location Centre (E-SMLC), a Serving Mobile Location Center (SMLC), a Secure User Plane Location (SUPL) Location Centre (SLC), and/or a SUPL Positioning Centre (SPC).

The network node 110A, 110B, 110C, 110D operating in the communication network 100 may use any cellular or wireless communication technology to communicate with the wireless device 120, such as LTE, e.g., LTE Frequency Division Duplex (FDD), LTE Time Division Duplex (TDD), LTE Half-Duplex Frequency Division Duplex (HD-FDD), LTE operating in an unlicensed band, or a Wideband Code Division Multiple Access (WCDMA), Universal Terrestrial Radio Access (UTRA TDD), Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies RATs such as e.g., Multi-Standard Radio (MSR) base stations, multi-RAT base stations etc., any 3rd Generation Partnership Project (3GPP) cellular network, Wi-Fi networks, Worldwide Interoperability for Microwave Access (WiMAX), 5 Generation (5G) or New Radio (NR) system or any cellular network or system. A wireless communication network refers to any type of network that establishes connections without cables. Wireless communications use ElectroMagnetic (EM) waves that travel through the air.

As used herein, the network node 110A, 110B, 110C, 110D, refers to equipment capable, configured, arranged and/or operable to communicate directly or indirectly with a wireless device and/or with other network nodes or equipment in the wireless network to enable and/or provide wireless access to the wireless device and/or to perform other functions e.g., administration in the wireless network. Examples of network nodes include, but are not limited to, access points APs e.g., radio access points, base stations (BSs), e.g., radio base stations, Node Bs, evolved Node Bs (eNBs) and new radio (NR) NodeBs gNBs. Base stations may be categorized based on the amount of coverage they provide or, stated differently, their transmit power level and may then also be referred to as femto base stations, pico base stations, micro base stations, or macro base stations. A base station may be a relay node or a relay donor node controlling a relay. A network node may also include one or more or all parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes e.g., MSCs, MMEs, O&M nodes, OSS nodes, SON nodes, positioning nodes e.g., E-SMLCs, and/or MDTs. As another example, a network node may be a virtual network node as described in more detail below. More generally, however, network nodes may represent any suitable device or group of devices capable, configured, arranged, and/or operable to enable and/or provide a wireless device with access to the wireless network or to provide some service to a wireless device that has accessed the wireless network. Unless otherwise noted, the term network node may be used interchangeably herein with base station.

As used herein, the wireless device (WD) 120 refers to a device capable, configured, arranged and/or operable to use any one of the different RATs to communicate wirelessly with the network node 110A, 110B, 110C, 110D and/or with other wireless devices. The wireless device 120 is served by the network node 110A, 110B, 110C, 110D using a RAT. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a user equipment (UE), a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support a device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things IoT scenario, a WD may represent a machine or other device that performs monitoring and/or measurements, and transmits the results of such monitoring and/or measurements to another WD and/or a network node 110A, 110B, 110C, 110D. The WD may in this case be a machine-to-machine (M2M) device, which may in a 3GPP context be referred to as a Machine-Type-Communication (MTC) device. As one particular example, the WD may be a UE implementing the 3GPP narrow band internet of things NB-IoT standard. Particular examples of such machines or devices are sensors, metering devices such as power meters, industrial machinery, or home or personal appliances, e.g. refrigerators, televisions, etc., personal wearables, e.g. watches, fitness trackers, etc. In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. Unless otherwise noted, the term WD may be used interchangeably herein with UE.

Examples of a RAT may be, e.g., Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, Z-Wave and/or ZigBee standards.

The Mobility Management Entity (MME) is accessible to the E-SMLC 130 via a SLs interface using a Location Service Application Protocol (LCS-AP). The MME is accessible to a Gateway Mobile Location Center (GMLC), and the eNodeB 110A, 110B, 110C, 110D via a SLg interface and a S1 interface, respectively. More details about these protocols and interfaces can be found in the corresponding standardization specification. To facilitate the reader, the corresponding standardization specifications for the protocols or interfaces are also shown in FIG. 1. For instance, the standardization specification 3GPP TS36.355 defines the LPP protocol. The MME and GMLC are shown in FIG. 1 is only for the information of reference, which may not be included in the network.

An example of a method performed by a positioning node 120, 130, e.g., for estimating a position of a wireless device 120 in a wireless communication network 100, will now be described with reference to FIG. 4A. In the example according to FIG. 4A, the reference signal exchanges between the network nodes, and between each network node and the wireless device, are transmitted over the air, e.g., via broadcast.

There are two pairs of networks nodes involved herein, while Actions 411-451 below are associated to a first pair of network nodes, and Actions 412-452 below are associated to a second pair of network nodes.

The method may comprise one or more of the following actions, which actions may be performed in any suitable order.

Action A411

The positioning node 120, 130 may obtain a minimum number of Time Difference of Arrivals (TDOAs) to be measured and a rate of measuring the TDOAs for a first sequence of TDOAs, i.e., TDOA1*s*. The above information may be obtained from one of network nodes 110A, 110B, 110C, 110D which is serving the wireless device 120.

The term Time of Arrival (TOA), sometimes called time of flight (ToF), is a travel time of a radio signal from a single transmitter to a remote single receiver. The TOA is an absolute time of arrival at the remote single receiver, e.g., the wireless device 120. Rather than using the absolute time of arrival, the TDOA is used herein. The wireless device 120 may keep measuring TOA at the wireless node 120 of reference signals over time. Based on two TOAs, the wireless device 120 computes a TDOA which refers to a time difference between the two TOAs. For instance, the wireless node 120 measures TOAs of a reference signal RS01 sent by a network node 110A and of another reference signal RS02 sent by another network node 110B for acknowledging a receipt of the reference signal RS01. Then the wireless device 120 computes a time difference between the two TOAs, i.e., TDOA. The term TDOA herein may be an Observed Time Difference of Arrival (OTDOA) in LTE appliance.

Each TDOA is a numerical value. A sequence of TDOAs means a plurality of TDOAs which are measured continuously in time. The sequence of TDOAs is a finite number of values. The term "rate of measuring the TDOAs" refers to a frequency of measuring the TDOAs. The number of TDOAs in the sequence is defined by the minimum number of TDOA to be measured.

The minimum number of TDOAs to be measured and the rate of measuring the TDOAs may be configured in the location server 130. The positioning node 120 may obtain them from the central server 130, if the positioning node is the wireless device 120. By obtaining the above information, the positioning node 120, 130 is aware of in which way to obtain the TDOAs.

Action A421

The positioning node 120, 130 obtains the first sequence of TDOAs which is measured at the wireless device 120 based on reference signals. The reference signals may be received, e.g., via broadcast over the air, from a first pair of network nodes 110A, 110B, and used for synchronization. The term synchronization used in this disclosure refers to the clock synchronization between a pair of network nodes. The clock synchronization may comprise phase and/or frequency synchronization of clocks. In a 5G or NR system, the synchronization over the air may be called Radio-Interface Based Synchronization (RIBS).

Figures 4B, 5A:
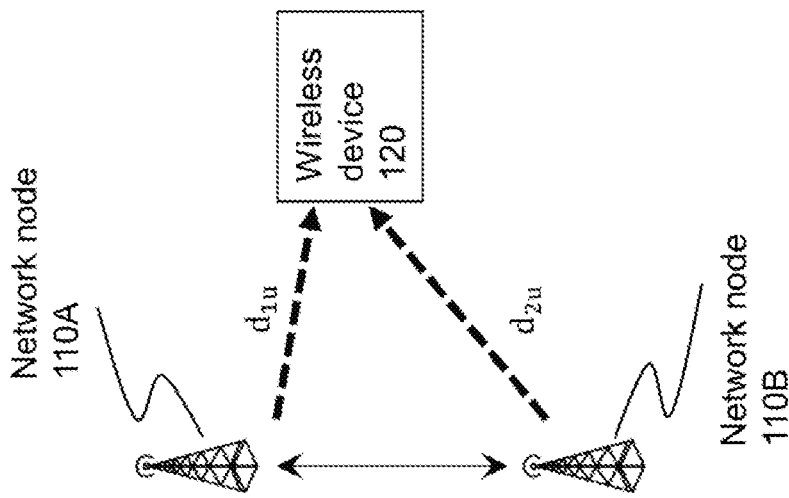
FIG. 5A is a schematic overview of an exemplifying communication according to embodiments herein.
Figures 5B, 5C:
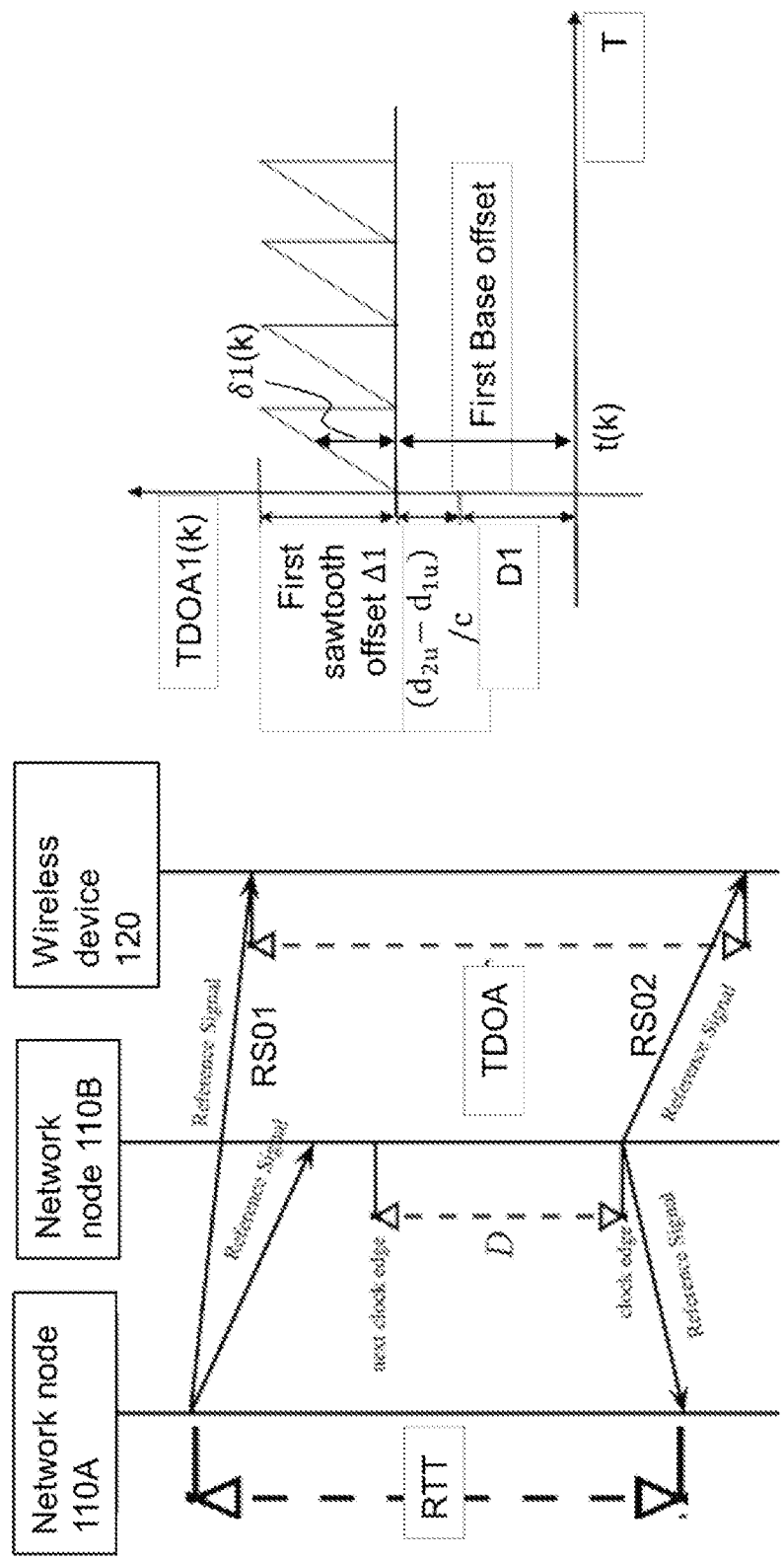
FIG. 5B is a signaling scheme of an exemplifying communication according to embodiments herein.
FIG. 5C is an exemplifying sequence of TDOAs according to embodiments herein.

As can be seen from FIG. 5B, the TDOA is different from the RTT, since TDOA is measured by the wireless device 120, while RTT is measured by the network node 110A. However, similarly to the sequence of RTTs measured by a network node, when the TDOA measurement by the wireless device is repeated over time, the TDOAs may also follow a sawtooth waveform. The sawtooth waveform is caused by a time offset $\delta(k)$ at a time point $t(k)$, k is an integer number. The time offset $\delta(k)$ is a time duration from a base offset to TDOA(k). The time offset $\delta(k)$ is resulted from a clock asynchronization between the network nodes in each pair. The time offset $\delta(k)$ varies along time. As shown in FIGS. 5B-5C, each TDOA will comprise three parts, i.e., a delay in response D, the time offset $\delta(k)$ and a relative propagation time.

As each TDOA is a numerical value, the sequence of TDOAs is a finite number of values. If the sequence of TDOAs is shown in a diagram, they may theoretically form a sawtooth waveform as shown in FIG. 5C. However, there is probably not a perfect match due to measurement errors, noise et cetera. It is well known to the skilled person that there are various conventional ways to fit the sawtooth waveform, which will be also discussed in details below.

As an example, a TDOA in the first sequence, i.e., TDOA1, at the time point $t(k)$ is as follows:

$$TDOA1(k) = D1 + \delta1(k) + (d_{2u} - d_{1u})/c.$$

The term D1 is a delay in response. The delay in response refers to a number of clock periods which a network node waits for and then responds with a reference signal for acknowledging a receipt of another reference signal. Taking the reference signal RS01 and the reference signal RS02 as an example again, the network node 110B waits a delay in response D1 and then transmits the reference signal RS02.

The term $\delta1(k)$ indicates a first time offset at the time point t(k) in the first sequence of TDOAs. The first time offset $\delta1(k)$ is a time duration from the first base offset to the TDOA1(k). The first time offset $\delta1(k)$ varies along time. A time difference between a maximum first time offset and a minimum first time offset which may be zero is called a first sawtooth offset $\Delta 1$ herein. That is to say, the first sawtooth offset $\Delta 1$ is time duration between the maximum and minimum levels of variation in the sawtooth. As the value of the first time offset $\delta1(k)$ varies along time, the value of the TDOA1(k) also varies along time.

The term $(d_{2u}-d_{1u})/c$ indicates a relative propagation time of a reference signal, which is a difference between propagation times from each network node 110A, 110B in the first pair to the wireless device 120. The $d_{1u}$, is a distance from the wireless device 120 to the network node 110A, $d_{2u}$, is a distance from the wireless device 120 to the network node 110B. The term $d_{2u}-d_{1u}$, is a relative distance indicating difference between distances from each network node 110A, 110B in the first pair to the wireless device 120. The term $d_{2u}-d_{1u}$ remains constant if the wireless device 120 is static and does not change its position. The skilled person would appreciate that the relative distance may also equally be defined as $d_{1u}-d_{2u}$. The term c is the speed of light.

The above-described action A421 of obtaining the first sequence of TDOAs, may be performed as follows. The wireless device 120 passively receives the transmitted reference signals RS01s, RS02s which are exchanged between network nodes 110A, 110B for the purpose of synchronization, measures TOAs, and computes the first sequence of TDOAs. As mentioned above, the positioning node 120 may be either the wireless device 120 or the location server 130. In both case, the wireless device 120 computes the TDOAs. When the positioning node 120 is a location server 130, the positioning node 120 may obtain the first sequence of TDOAs by further receiving it from the wireless device 120.

The embodiments herein can be applied for both UE-assisted positioning and UE-based positioning. It should be noted that the term UE is used herein as a synonym for wireless device. Further, the term eNB is frequently used below as an example of a network node.

UE-Assisted Positioning

In the UE-assisted positioning, the positioning node is the location server 130. In this case, the UE 120 may further receive assistance information related to the reference signals. The assistance information may comprise one or more of: a time and/or frequency resources used by the reference signals; an identity or sequence configuration of the reference signal could be blindly detectable.

Furthermore, the UE may be configured with information about the reference signals, e.g., an identifier, a sequence generation parameter, a time resource and a frequency resource etc. Once the UE has completed the TDOA measurements, it will send them to the location server 130 for positioning calculation. Optionally, the UE will receive an computed position in return.

Taking E-SMLC as an example of the location server 130, the UE may assist the positioning in the E-SM LC by providing measurements. For example, for the OTDOA as a UE-assisted method, the UE could be provided with assistance data about which specific positioning reference signals (PRS) it can expect. The UE then measures the time of arrival TOA of the PRSs from multiple cells eNBs, and computes the time differences between each cell and a reference cell. These reference signal time difference (RSTD) are quantized and reported via LPP to the E-SM LC together with an accuracy assessment.

UE-Based Positioning

In the UE-based positioning, the positioning node is the wireless device 120 itself. In addition to the configuration in the UE-assisted positioning, the UE is also configured with coordinates of transmission points from which reference signals are transmitted.

Optionally, the UE will send the computed position to the network node. Based on known positions of eNBs and their mutual clock synchronization, it is possible for the E-SMLC to estimate the UE position from the above-mentioned RSTD and covariance reports using multilateration.

The proposed UE herein can determine the clock error of respective network node pairs and at the same time position itself.

In the UE-based positioning case, the UE is provided also with the eNB coordinates and relative clock synchronization in order to enable it to compute its position by itself.

Action A431

In order to obtain a precise relative propagation time, the positioning node 120, 130 may further determine the first base offset associated with the first sequence of TDOAs.

A base offset is equal to the minimum first time offset, i.e., the minimum level of the sawtooth. It is a time duration from the time axis T to the minimum level of the sawtooth. From another perspective, the base offset refers to a sum of the delay in response and the relative propagation time, e.g., $D1+(d_{2u}-d_{1u})/c$. The first base offset has a constant value in TDOAs of the first sequence. That may be because the TOAs are measured in a time duration during which the wireless device 130 is supposed to be static, particularly when such a time duration is very short.

According to some embodiments, a method for determining the first base offset, in the Action 431, may comprise fitting the sawtooth waveform from the sequences of TDOAs. Thereby the sawtooth offset $\Delta$, the base offset, the phase and frequency of the sawtooth can be obtained. For instance, the positioning node 120, 130 may run a curve fitting algorithm or a Fourier analysis on the sequences of TDOAs to fit the sawtooth waveform. An example of the curve fitting algorithm include a least squares. However it is well known to the skilled person that there are various conventional ways, not limited to curve fitting algorithm or a Fourier analysis, to fit the sawtooth waveform. The embodiments herein are not limited to any of them.

Action A441

In order to obtain a precise relative propagation time, the positioning node 120, 130 may further determine a first delay in response D1 associated with the first sequence of TDOAs.

The first delay in response is known to the positioning node 120, 130. As shown in FIG. 5B, the first delay in response D1 may be a number of clock periods that the network node 110B waits for transmitting the reference signal RS01 for acknowledging the receipt of the reference signal RS02.

Action A451

The positioning node 120, 130 determines, based on the first sequence of TDOAs, a first relative distance $d_{2u}-d_{1u}$, which is a difference between distances from the wireless device 120 to each network node 110A, 110B in the first pair.

According to some embodiments, the positioning node 120, 130 may determine the first relative distance $d_{2u}-d_{1u}$ based on the first base offset in the first sequence of TDOAs, if the first base offset is determined in Action A431. The sawtooth offset Δ reflects the actual clock error between the network nodes, which is one source of a positioning error.

By determining the first relative distance $d_{2u}-d_{1u}$ based on the first base offset in the first sequence of TDOAs, instead of the first sawtooth offset Δ1, the embodiments herein have a benefit that the positioning is independent from the clock errors.

According to some embodiments, the positioning node 120, 130 may determine the first relative distance $d_{2u}-d_{1u}$ further based on the first delay in response D1 in the first sequence of TDOAs, if the first delay in response D1 has been determined in Action A441 and is more than zero. According to an implementation form, the positioning node 120, 130 may determine the first relative distance $d_{2u}-d_{1u}$ by removing the first delay in response D1 from the first base offset, to obtain the relative propagation time $(d_{2u}-d_{1u})/c$. Then the first relative distance $d_{2u}-d_{1u}$ may be obtained by multiplying the relative propagation time $(d_{2u}-d_{1u})/c$ with, e.g., the speed of light c.

By removing the first delay in response D1 from the first base offset, a more precise relative propagation time $(d_{2u}-d_{1u})/c$ is obtained; thereby a precise relevance distance can be obtained. Thanks to the precise relevance distance, a more precise positioning can be achieved accordingly.

Action A412

Similar to the Action 411, the positioning node 120, 130 may obtain a minimum number of TDOAs to be measured and to use a certain rate of measuring the TDOAs for a second sequence of TDOAs, i.e., TDOA2s. The above information may be obtained from one of the network nodes 110A, 110B, 110C, 110D which is serving the wireless device 120.

The Actions A412 and A422 may be two separate actions; alternatively they may be one single action. In case of one single action, it means that for both the first and second sequences of TDOAs, the minimum number and the rate of measuring are obtained at the same time.

Figures 6, 7:
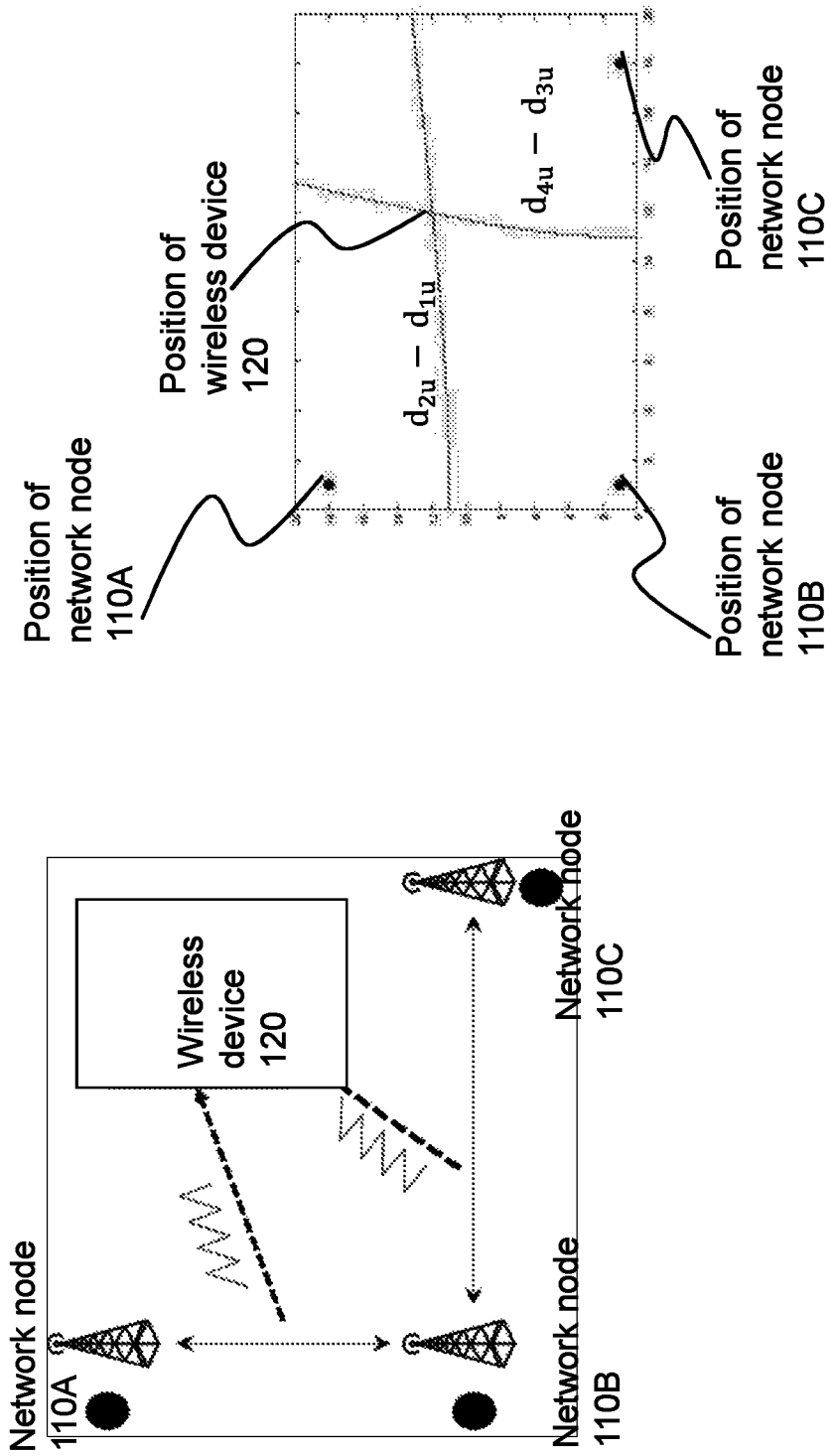
FIG. 6 is a schematic overview of another exemplifying communication according to embodiments herein.
FIG. 7 illustrates an exemplifying positioning based on trajectories according to embodiments herein.

According to some embodiments, the first and second pairs of network nodes 110A, 110B, 110C, 110D) may share one common network node. In this case, there are three different network nodes, e.g., 110A, 110B and 110C, as shown in FIGS. 6-7. However, all four network nodes can be different, i.e., network nodes 110A, 110B, 110C and 110D.

Action A422 The positioning node 120, 130 obtains, from the wireless device 120, the second sequence of TDOAs of reference signals, which are transmitted, e.g., broadcasted, by and used for synchronization of a second pair of network nodes 110C, 110D.

The same procedure as described in Action A421 can be used to obtain the second sequence of TDOAs, i.e., TDOA2s:

$$TDOA2(k)=D2+\delta 2(k)+(d_{4u}-d_{3u})/c.$$

The term D2 is a delay in response, δ2(k) indicates a second time offset at the time point t(k) in the second sequence of TDOAs, and term $(d_{4u}-d_{3u})/c$ indicates a relative propagation time of a reference signal, which is a difference between transmission times from each network node 110C, 110D in the second pair to the wireless device 120. The second time offset δ2(k) varies along time. A time difference between a maximum second time offset and a minimum second time offset which may be zero is called a second sawtooth offset Δ2 herein. In other words, the second sawtooth offset Δ2 is a time duration between the maximum and minimum levels of variation in the sawtooth. The $d_{3u}$ is a distance from the wireless device 120 to the network node 110C, $d_{4u}$ is a distance from the wireless device 120 to the network node 110D. The term $d_{4u}-d_{3u}$ is the relative distance indicating difference between distances from the wireless device 120 to each network node 110C, 110D in the second pair.

As shown in FIG. 6, the wireless device 120 listens to the reference signal exchanges between the network node 110A and the network node 110B, and between the network node 110B and a network node 110C or between network nodes 110C and 110D.

Thus, the wireless device 120 obtains two sawtooth waveforms from two sequences of TDOAs. From each individual sawtooth waveform, the wireless device 120 can estimate the clock asynchronization between network nodes.

Action A432

The positioning node 120, 130 may further determine the second base offset associated with the second sequence of TDOAs, by using the same method as described in the Action A431. The second base offset has a constant value in the second sequence of TDOAs.

Action A442

The positioning node 120, 130 may further determine a second delay in response D2 associated with the second sequence of TDOAs.

The same as the first delay in response D1, the second delay in response D2 is also known to the positioning node 120, 130. The second delay in response D2 may be a number of clock periods that the network node 110D waits for transmitting the reference signal RS04 for acknowledging the receipt of the reference signal RS03 from the network node 110C. In other words, the second delay in response D2 is introduced by one of the network nodes in each pair when timing its transmissions of reference signals.

Action A452

The positioning node 120, 130 determines, based on the second sequence of TDOAs, a second relative distance $d_{4u}-d_{3u}$, which is a difference between distances from the wireless device 120 to each network node 110C, 110D in the second pair.

According to some embodiments, the positioning node 120, 130 may determine the second relative distance $d_{4u}-d_{3u}$ based on the second base offset in the second sequence of TDOAs, if the second base offset is determined in Action A432.

Due to the second base offset is a constant value, by determining the second relative distance $d_{4u}-d_{3u}$ based on the second base offset, the second sawtooth offset Δ2 is not taken into account. The embodiments herein have the benefit that the determining of the position is independent from the clock errors.

According to some embodiments, the positioning node 120, 130 may determine the second relative distance $d_{4u}-d_{3u}$ further based on the second delay in response D2 in the second sequence of TDOAs, if the second delay in response D2 has been determined in Action A442 and is more than zero. For instance, the positioning node 120, 130 may determine the first relative distance $d_{4u}-d_{3u}$ by further removing the second delay in response D2 from the second base offset, in order to obtain the relative propagation time $(d_{4u}-d_{3u})/c$. Then the second relative distance $d_{4u}-d_{3u}$ may be obtained by multiplying the relative propagation time $(d_{4u}-d_{3u})/c$ with, e.g., the speed of light c.

By removing the second delay in response D2 from the second base offset, a precise relative propagation time $(d_{2u}-d_{1u})/c$ is obtained, a more precise positioning is achieved accordingly.

Action A460

The positioning node 120, 130 determines the position of the wireless device 120 based on the first and second relative distances $d_{2u}-d_{1u}$, $d_{4u}-d_{3u}$.

According to some embodiments, the positioning node 120, 130 determines the position which is consistent with both the first and second relative distances $d_{2u}-d_{1u}$, $d_{4u}-d_{3u}$.

According to some embodiments, the positioning node 120, 130 may determine the position by determining an intersection of trajectories of the first and the second relative distances $d_{2u}-d_{1u}$, $d_{4u}-d_{3u}$, which will be discussed in details below in connection with FIG. 4B.

Action A460 where the positioning node 120, 130 determines the position may be implemented in accordance with FIG. 4B. The method may comprise one or more of the following actions, which actions may be taken in any suitable order.

Action A461

The positioning node 120, 130 computes a trajectory of the first relative distance $d_{2u}-d_{1u}$ The term trajectory is used here to reflect a collection of points in space where the UE, currently, might be located given the relative distance, e.g., $d_{2u}-d_{1u}$.

Action A463

The positioning node 120, 130 computes a trajectory of the second relative distance $d_{4u}-d_{3u}$, which may be hyperbolic.

Action A465

The positioning node 120, 130 determines an intersection of trajectories of the first and the second relative distances $d_{2u}-d_{1u}$, $d_{4u}-d_{3u}$.

Two hyperbolic trajectories are shown in FIG. 7. Using the two intersecting hyperbolas, the wireless device 120 can position itself at the point where the trajectories intersect. Alternately, the wireless device 120 can transmit the two TDOA measurements to a location server 130 where the position estimation of the wireless device 120 as shown in FIGS. 4A-4B can be done. The wireless device 120 can be informed of the position by the location server 130, which in this case thus acts as the above-described positioning node.

Note that the trajectory is not always necessary "hyperbolic". For example, if a relative distance is zero, the trajectory is a straight line. Moreover, there may be special cases when an absolute value of the relative distance is equal to a distance between the two network nodes. In such a case, the trajectories are rays from either network node parallel with a straight line connecting the two network nodes. If the absolute value of the relative distance is greater than a distance between the two network nodes, we may have measurement errors, since this should not be possible due to the triangle inequality.

The skilled person will appreciate that a means other than the trajectory to determine the position can also be applied to the embodiments herein.

The embodiments herein have the benefit that the hyperbolas do not get affected even in a presence of clock errors between network nodes, since the determined relative distances are not affected by the clock errors.

Figure 4A:
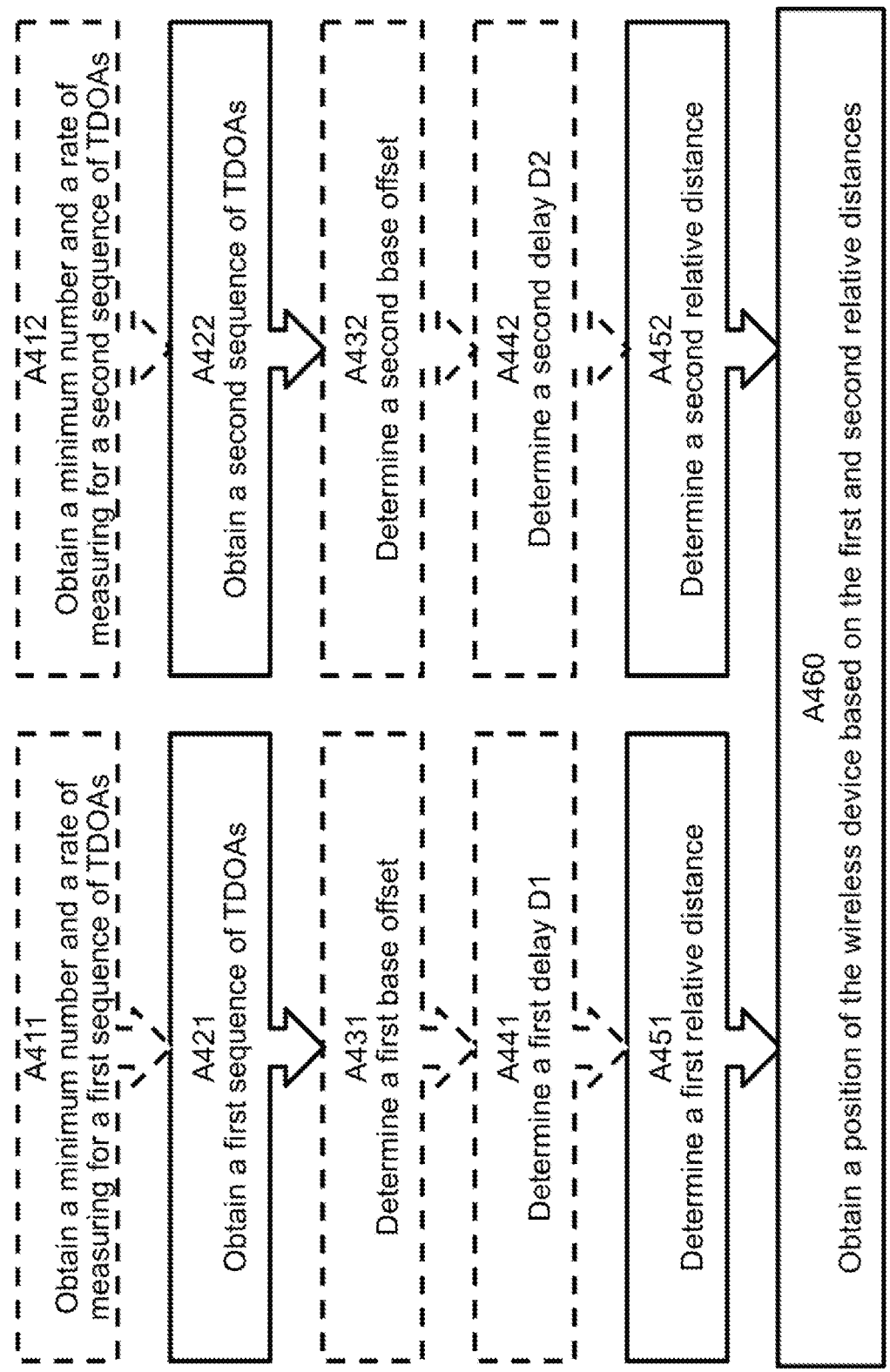
FIGS. 4A-4B are flowcharts depicting actions that may be performed by a positioning node according to embodiments herein.

Differently from the procedure shown in FIG. 4A where the reference signals are broadcasted, the reference signals may instead be eavesdropped by the wireless device 120, i.e., without being known by the network nodes according to embodiments herein. Apart from this, other aspects could be the same as the procedure shown in FIG. 4A.

For instance, a method performed by a positioning node 120, 130, e.g., for estimating a position of a wireless device 120 in a wireless communication network 100, may comprise:

obtaining a first sequence of Time Difference of Arrivals, TDOAs, at the wireless device 120 of reference signals, which are unicasted by and used for synchronization of a first pair of network nodes 110A, 110B;

determining based on the first sequence of TDOAs, a first relative distance $d_{2u}-d_{1u}$, which is a difference between distances from the wireless device 120 to each network node 110A, 110B in the first pair;

obtaining a second sequence of TDOAs at the wireless device 120 of reference signals, which are unicasted by and used for synchronization of a second pair of network nodes 110C, 110D;

determining, based on the first sequence of TDOAs, a second relative distance $d_{4u}-d_{3u}$, which is a difference between distances from the wireless device 120 to each network node 110C, 110D in the second pair; and determining the position of the wireless device 120 based on the first and second relative distances $d_{2u}-d_{1u}$, $d_{4u}-d_{3u}$.

In this procedure, the network nodes 110A, 110B, 110C, 110D unicast the reference signals, and the wireless device 120 eavesdrops the unicasted reference signals, in order to obtain the sequences of TDOAs.

An example of a method performed by a network node 110A in a wireless communication network 100, e.g., for enabling a positioning node 120, 130 to estimate a position of a wireless device 120, will now be described with reference to FIG. 8. The method in this example may comprise one or more of the following actions, which actions may be taken in any suitable order.

Action 810

The network node 110A may transmit, to the wireless device 120, a minimum number of TDOAs to be measured and a rate of measuring the TDOAs for the sequence of TDOAs.

Action 820

The network node 110A transmits, e.g., broadcasts, a sequence of reference signals, e.g., RS01s.

Action 830

The network node 110A receives a sequence of reference signals, e.g., RS02s, transmitted, e.g., broadcasted, by another network node 110B for acknowledging receipts of the reference signals RS01s.

The reference signals, e.g., RS01s, RS02s, mentioned in Actions 820-830 are used for both enabling the positioning node 120 to estimate said position based on a sequence of TDOAs, of the reference signals at the wireless device 120 and for synchronization between the two network nodes 110A, 110B.

According to some embodiments, the network nodes 110A, 110B may transmit, e.g., broadcast, the reference signals, e.g., RS01s, RS02s, mentioned in Actions 820-830 by using a wireless communication technology. Thereby, the network nodes 110A, 110B and the wireless device 120 can receive the reference signals, e.g., RS01s, RS02s, by using the wireless communication technology.

Some embodiments herein provide a more precise positioning comparing to a conventional GPS positioning. The GPS positioning relies on point-to-point protocol (PTP). The PTP in backhaul and GPS signals are prime sources of clock synchronization in wireless networks. However, such solutions suffer from poor accuracy. GPS solutions may provide an accuracy at an order of 10 ns (nano seconds), and equivalent to about 3 meters. However, such precision is not sufficient for many applications including high precision positioning. Moreover, clock asynchronization may also be considered and corrected in GPS based positioning. However, in GPS, the satellites have very synchronized atomic clocks. Accuracy of clocks and synchronization is controlled by ground stations. While in a cellular network, the network nodes do not have such high accuracy in synchronization and clock performance.

The reference signals exchanged between network nodes can be transmitted over the air or they can be communicated using wired backhaul, while transmitting the reference signal to the wireless device 120 over the air at the same time.

Being different from the over the air example according to FIG. 4A, the reference signals, e.g., RS01s, RS02s, exchange between network nodes is over wired backhaul herein.

In other words, the network nodes may transmit the reference signals, e.g., RS01s, RS02s, between themselves by using a wired communication technology, and by using a wireless communication technology between the wireless device 120 and each network node. In this case, there might be two different types of reference signals, one is wired for synchronization of network nodes and the other is wireless for positioning. Apart from this, other aspects are the same as the embodiments shown in FIG. 4A. A timing of transmitting the two types of reference signals is coupled, that is the reference signal via wireless is transmitted at the same time point as the one via wire, or with a fixed time shift relative to the one via wire.

The wired communication can be done using some existing wired infrastructure between network nodes. A medium can be L2 lines or even Ethernet cables.

To perform the above-described actions for estimating a position of a wireless device 120 in a wireless communication network 100, the positioning node 120, 130 may be configured to:

obtain a first sequence of TDOAs, at the wireless device 120 of reference signals, which are transmitted by and used for synchronization of a first pair of network nodes 110A, 110B;

determine, based on the first sequence of TDOAs, a first relative distance $d_{2u}-d_{1u}$, which is a difference between distances from the wireless device 120 to each network node 110A, 110B in the first pair;

obtain a second sequence of TDOAs at the wireless device 120 of reference signals, which are transmitted by and used for synchronization of a second pair of network nodes 110C, 110D;

determine, based on the first sequence of TDOAs, a second relative distance $d_{4u}-d_{3u}$, which is a difference between distances from the wireless device 120 to each network node 110C, 110D in the second pair; and determine the position of the wireless device 120 based on the first and second relative distances $d_{2u}-d_{1u}$, $d_{4u}-d_{3u}$.

According to some embodiments, the positioning node 120, 130 may further be configured to determine the position which is consistent with both the first and second relative distances $d_{2u}-d_{3u}$.

According to some embodiments, the positioning node 120, 130 may further be configured to perform at least one of:

determining a first base offset associated with the first sequence of TDOAs, and determining the first relative distance $d_{2u}-d_{1u}$ further based on the first base offset; and determining a second base offset associated with the second sequence of TDOAs, and determining the second relative distance $d_{4u}-d_{3u}$ further based on the second base offset.

According to some embodiments, the positioning node 120, 130 may further be configured to perform at least one of:

determining a first delay in response D1 associated with the first sequence of TDOAs, and determining the first relative distance $d_{2u}-d_{1u}$ further based on the first delay in response D1 if the first delay in response D1 is more than zero; and determining a second delay in response D2 associated with the second sequence of TDOAs, and determining the second relative distance $d_{4u}-d_{3u}$ further based on the second delay in response D2 if the second delay in response D2 is more than zero.

According to some embodiments, the positioning node 120, 130 may further be configured to obtain a minimum number of TDOAs to be measured and a rate of measuring the TDOAs for each sequence of TDOAs, from one of the network nodes 110A, 110B, 110C, 110D which is serving the wireless device 120.

According to some embodiments, the positioning node 120, 130 is a location server 130. The positioning node 120, 130 may further be configured to obtain the first and second sequences of TDOAs by receiving the first and second sequences of TDOAs from the wireless device 120.

Figure 9:
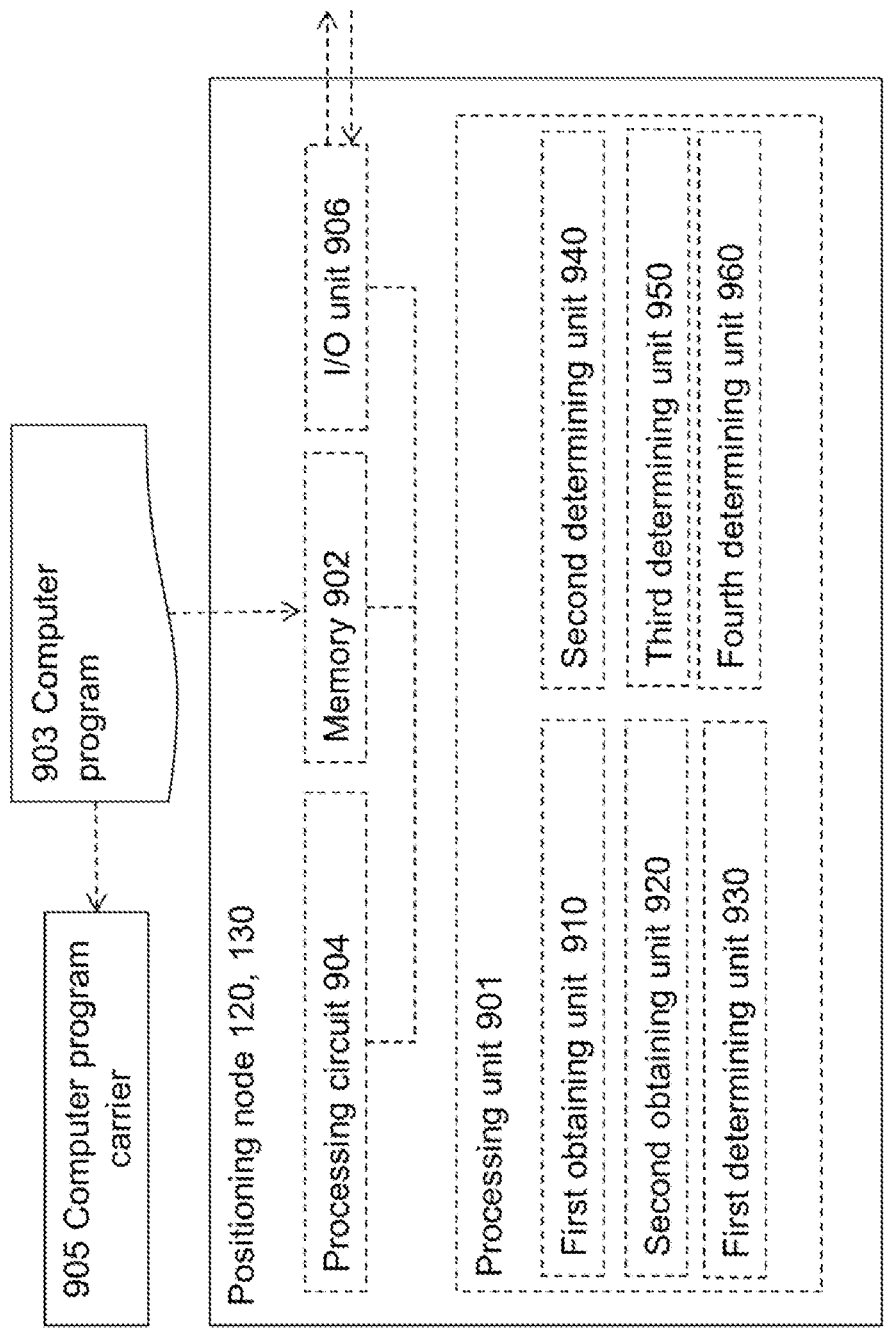
FIG. 9 is a schematic block diagram illustrating embodiments of a positioning node.

To perform the actions for estimating a position of a wireless device 120 in a wireless communication network 100, the positioning node 120, 130 may comprise the following arrangement depicted in FIG. 9.

The positioning node 120, 130 may comprise a first obtaining unit 910, configured to obtain a minimum number of TDOAs to be measured and a rate of measuring the TDOAs for each sequence of TDOAs, from one of the network nodes 110A, 110B, 110C, 110D which is serving the wireless device 120.

The positioning node 120, 130 may comprise a second obtaining unit 920, configured to obtain a first sequence of TDOAs at the wireless device 120 of reference signals, which are transmitted by and used for synchronization of a first pair of network nodes 110A, 110B; and/or to obtain a second sequence of TDOAs at the wireless device 120 of reference signals, which are transmitted by and used for synchronization of a second pair of network nodes 110C, 110D.

The positioning node 120, 130 may comprise a first determining unit 930, configured to determine a first base offset associated with the first sequence of TDOAs, and/or to determine a second base offset associated with the second sequence of TDOAs.

The positioning node 120, 130 may comprise a second determining unit 940, configured to determine a first delay in response D1 associated with the first sequence of TDOAs; and/or to determine a second delay in response D2 associated with the second sequence of TDOAs.

The positioning node 120, 130 may comprise a third determining unit 950, configured to determine, based on the first sequence of TDOAs, a first relative distance $d_{2u}-d_{1u}$, which is a difference between distances from the wireless device 120 to each network node 110A, 110B in the first pair; and/or to determine, based on the first sequence of TDOAs, a second relative distance $d_{4u}-d_{3u}$, which is a difference between distances from the wireless device 120 to each network node 110C, 110D in the second pair. The third determining unit 950 may also be configured to determine the first relative distance $d_{2u}-d_{1u}$ further based on at least one of the first base offset and the first delay in response D1 if the first delay in response D1 is more than zero. The third determining unit 950 may also be configured to determine the second relative distance $d_{4u}-d_{3u}$, further based on at least one of the second base offset, and the second delay in response D2 if the second delay in response D2 is more than zero.

The positioning node 120, 130 may comprise a fourth determining unit 960, configured to determine the position of the wireless device 120 based on the first and second relative distances $d_{2u}-d_{1u}$, $d_{4u}-d_{3u}$.

According to some embodiments, as shown in FIG. 9, the positioning node 120, 130 may comprise a processor or processing unit 901, such as a means for performing the methods described in FIGS. 4A-4B, and the methods described above. The means may be embodied in the form of one or more hardware units and/or one or more software units.

In some embodiments, the processing unit 901 may comprise one or more of the units 910-960.

The positioning node 120, 130 may further comprise a memory 902. The memory may comprise, such as contain or store, instructions, e.g., in the form of a computer program 903, which may comprise computer readable code units.

According to some embodiments herein, the positioning node 120, 130 and/or the processing unit 901 comprises a processing circuit 904 as an exemplifying hardware unit, which may comprise one or more processors. Accordingly, the processing unit 901 may be embodied in the form of, or 'realized by', the processing circuit 904. The instructions may be executable by the processing circuit 904, whereby the positioning node 120, 130 is operative to perform at least some of the actions of FIGS. 4A-4B. As another example, the instructions, when executed by the positioning node 120, 130 and/or the processing circuit 904, may cause the positioning node 120, 130 to perform at least some of the actions of FIGS. 4A-4B.

FIG. 9 further illustrates a computer program carrier 905, or program carrier, which comprises the computer program 903 as described directly above.

Moreover, positioning node 120, 130 may further comprise an Input/Output unit 906.

Figure 8:
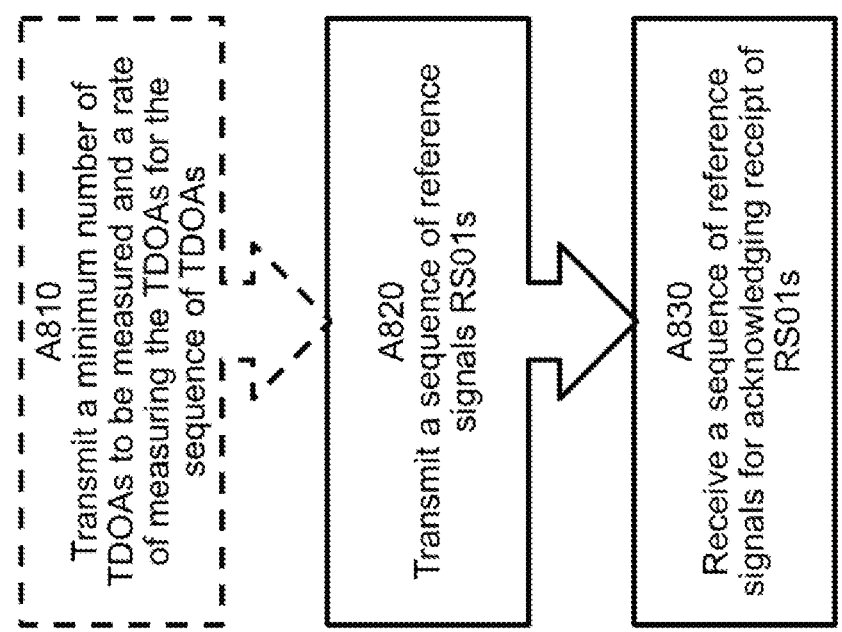
FIG. 8 is a flowchart depicting actions that may be performed by a network node according to embodiments herein.

To perform the above-described actions for enabling a positioning node 120, 130 to estimate a position of a wireless device 120 according to FIG. 8, the network node 110A may be configured to transmit a sequence of reference signals, and to receive a sequence of reference signals transmitted by another network node 110B for acknowledging receipts of the reference signals transmitted by the network node 110A.

The reference signals could be used for both enabling the positioning node 120 to estimate said position based on a sequence of TDOAs of the reference signals at the wireless device 120, and for synchronization between the two network nodes 110A, 110B.

According to some embodiments, the network node 110A may further be configured to transmit, to the wireless device 120, a minimum number of TDOAs to be measured and a rate of measuring the TDOAs for the sequence of TDOAs.

According to some embodiments, the network node 110A may further be configured to receive a sequence of reference signals from the other network node 110B, and transmit a sequence of reference signals for acknowledging receipts of the reference signals transmitted by the other network node 110B.

Figure 10:
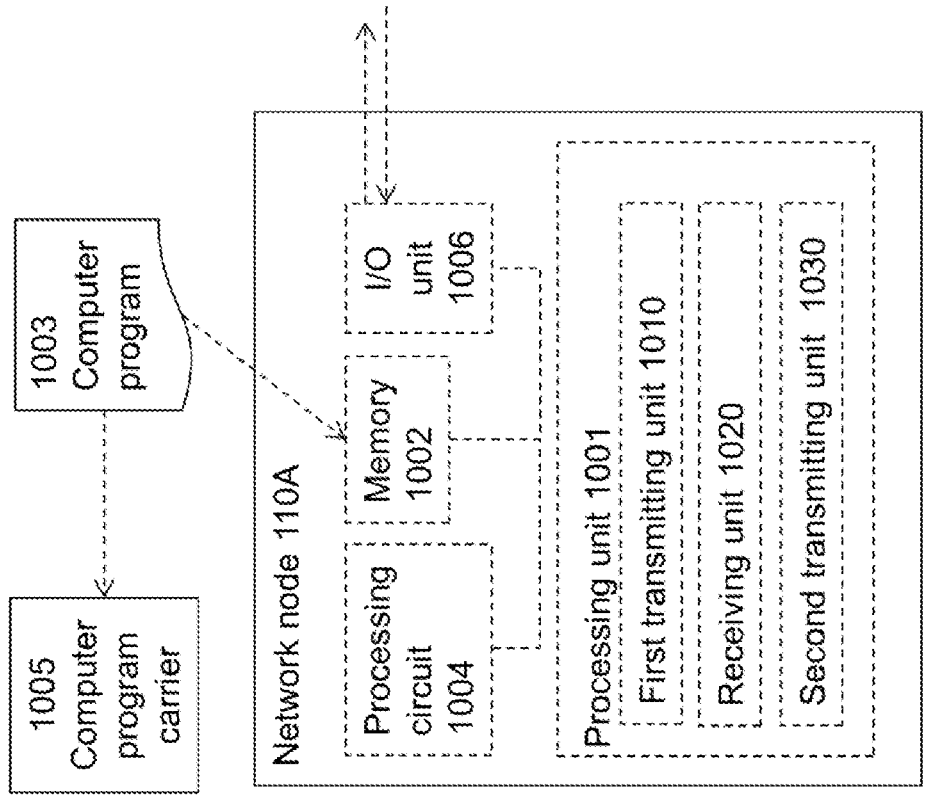
FIG. 10 is a schematic block diagram illustrating embodiments of a network node.

To perform at least some of the above-described actions for enabling a positioning node 120, 130 to estimate a position of a wireless device 120 according to FIG. 8, the network node 110A may comprise the following arrangement depicted in FIG. 10.

The network node 110A may comprise a first transmitting unit 1010, configured to transmit a sequence of reference signals.

The network node 110A may comprise a receiving unit 1020, configured to receive a sequence of reference signals transmitted by another network node 110B for acknowledging receipts of the reference signals transmitted by the network node 110A.

The reference signals are used for both enabling the positioning node 120 to estimate said position based on a sequence of TDOAs of the reference signals at the wireless device 120 and for synchronization between the two network nodes 110A, 110B.

The network node 110A may further comprise a second transmitting unit 1030, configured to transmit, to the wireless device 120, a minimum number of TDOAs to be measured and a rate of measuring the TDOAs for the sequence of TDOAs.

According to some embodiments, as shown in FIG. 10, the network node 110A may comprise a processor or processing unit 1001, such as a means for performing at least some of the actions of FIG. 8 described above. The means may be embodied in the form of one or more hardware units and/or one or more software units.

In some embodiments, the processing unit 1001 may comprise one or more of the units 1010-1030.

The network node 110A may further comprise a memory 1002. The memory may comprise, such as contain or store, instructions, e.g., in the form of a computer program 1003, which may comprise computer readable code units.

According to some embodiments herein, the network node 110A and/or the processing unit 1001 comprises a processing circuit 1004 as an exemplifying hardware unit, which may comprise one or more processors. Accordingly, the processing unit 1001 may be implemented in the form of, or 'realized by', the processing circuit 1004. The instructions may be executable by the processing circuit 1004, whereby the network node 110A is operative to perform at least some of the actions of FIG. 8. As another example, the instructions, when executed by the network node 110A and/or the processing circuit 1004, may cause the network node 110A to perform at least some of the actions of FIG. 8.

FIG. 10 further illustrates a computer program carrier 1005, or program carrier, which comprises the computer program 1003 as described directly above.

Moreover, network node 110A may further comprise an Input/Output unit 1006.

Example of embodiments of a wireless communication network 100, e.g., for enabling a positioning node 120, 130 to estimate a position of a wireless device 120 in the wireless communication network 100, will now be described with reference to FIG. 1. The wireless communication network 100 comprises a positioning node 120, 130 according to the example illustrated in FIG. 9.

The wireless communication network may further comprise two pairs of network nodes 110A and 110B, 110C and 110D, wherein each pair 110A and 110B, 110C and 110D comprises two network nodes according to the example illustrated in FIG. 9.

Further Examples and Embodiments

A positioning node 120, 130 may be provided for estimating a position of a wireless device 120 in a wireless communication network 100, where the positioning node 120, 130 comprises:

a second obtaining unit 920, configured to obtain a first sequence of TDOAs at the wireless device 120 of reference signals, which are transmitted by and used for synchronization of a first pair of network nodes 110A, 110B; and/or to obtain a second sequence of TDOAs at the wireless device 120 of reference signals, which are transmitted by and used for synchronization of a second pair of network nodes 110C, 110D;

a third determining unit 950, configured to determine, based on the first sequence of TDOAs, a first relative distance $d_{2u}-d_{1u}$, which is a difference between distances from the wireless device 120 to each network node 110A, 110B in the first pair; and/or to determine, based on the first sequence of TDOAs, a second relative distance $d_{4u}-d_{3u}$, which is a difference between distances from the wireless device 120 to each network node 110C, 110D in the second pair;

a fourth determining unit 960, configured to determine the position of the wireless device 120 based on the first and second relative distances $d_{2u}-d_{1u}$, $d_{4u}-d_{3u}$.

The positioning node may further comprise a first obtaining unit 910, configured to obtain a minimum number of TDOAs to be measured and a rate of measuring the TDOAs for each sequence of TDOAs, from one of the network nodes 110A, 110B, 110C, 110D which is serving the wireless device 120.

The positioning node may further comprise a first determining unit 930, configured to determine a first base offset associated with the first sequence of TDOAs, and/or to determine a second base offset associated with the second sequence of TDOAs.

The positioning node may further comprise a second determining unit 940, configured to determine a first delay in response D1 associated with the first sequence of TDOAs; and/or to determine a second delay in response D2 associated with the second sequence of TDOAs.

The third determining unit 950 may be configured to determine the first relative distance $d_{2u}-d_{1u}$ further based on at least one of the first base offset and the first delay in response D1 if the first delay in response D1 is more than zero. The third determining unit 950 may also be configured to determine the second relative distance $d_{4u}-d_{3u}$, further based on at least one of the second base offset, and the second delay in response D2 if the second delay in response D2 is more than zero.

The positioning node 120, 130 may also comprise a processor 901 configured to perform at least some of the actions described above, where appropriate.

A network node 110A may further be provided in a wireless communication network 100 for enabling a positioning node 120, 130 to estimate a position of a wireless device 120, where the network node 110A comprises:

a first transmitting unit 1010, configured to transmit a sequence of reference signals; and a receiving unit 1020, configured to receive a sequence of reference signals transmitted by another network node 110B for acknowledging receipts of the reference signals transmitted by the network node 110A;

wherein the reference signals are used for both enabling the positioning node 120 to estimate said position based on a sequence of TDOAs of the reference signals at the wireless device 120 and for synchronization between the two network nodes 110A, 110B.

The network node 110A may further comprise a second transmitting unit 1030, configured to transmit, to the wireless device 120, a minimum number of TDOAs to be measured and a rate of measuring the TDOAs for the sequence of TDOAs.

The network node 110A may also comprise a processor 1001 performing at least some of the actions described above, where appropriate.

When using the word "comprise" or "comprising" it shall be interpreted as non-limiting, i.e. meaning "include at least".

The embodiments herein are not limited to the above described features and details. Various alternatives, modifications and equivalents may be used. Therefore, the above embodiments should not be taken as limiting the scope of the solution, which is defined by the appending claims.

The invention claimed is:

1. A method performed by a positioning node for determining a position of a wireless device in a wireless communication network, the method comprising:
   obtaining a first sequence of Time Difference of Arrivals (TDOAs) at the wireless device of reference signals, which are transmitted by and used for synchronization of a first pair of network nodes;
   determining a first base offset and a first delay in response associated with the first sequence of TDOAs;
   determining a first relative distance $d_{2u}-d_{1u}$ based on the first base offset and the first delay in response if the first delay in response is more than zero, wherein the first relative distance $d_{2u}-d_{1u}$ is a difference between distances from the wireless device to each network node in the first pair;
   obtaining a second sequence of TDOAs at the wireless device of reference signals, which are transmitted by and used for synchronization of a second pair of network nodes;
   determining a second base offset and a second delay in response associated with the second sequence of TDOAs;
   determining a second relative distance $d_{4u}-d_{3u}$ based on the second base offset and the second delay in response if the second delay in response is more than zero, wherein the second relative distance $d_{4u}-d_{3u}$ is a difference between distances from the wireless device to each network node in the second pair; and
   determining the position of the wireless device based on the first and second relative distances $d_{2u}-d_{1u}$, $d_{4u}-d_{3u}$.

2. The method according to claim 1, wherein the determining of the position comprises:
   determining the position which is consistent with both the first and second relative distances $d_{2u}-d_{1u}$, $d_{4u}-d_{3u}$.

3. The method according to claim 1, further comprising:
   obtaining a minimum number of TDOAs to be measured and a rate of measuring the TDOAs for each sequence of TDOAs, from one of the network nodes which is serving the wireless device.

4. The method according to claim 1, wherein the first and second sequences of TDOAs is obtained by receiving the first and second sequences of TDOAs from the wireless device.

5. A positioning node for determining a position of a wireless device in a wireless communication network, the positioning node is configured to:

obtain a first sequence of Time Difference of Arrivals (TDOAs) at the wireless device of reference signals, which are transmitted by and used for synchronization of a first pair of network nodes;

determine a first base offset and a first delay in response associated with the first sequence of TDOAs;

determine a first relative distance $d_{2u}-d_{1u}$ based on the first base offset and the first delay in response if the first delay in response is more than zero, wherein the first relative distance $d_{2u}-d_{1u}$ is a difference between distances from the wireless device to each network node in the first pair;

obtain a second sequence of TDOAs at the wireless device of reference signals, which are transmitted by and used for synchronization of a second pair of network nodes;

determine a second base offset and a second delay in response associated with the second sequence of TDOAs;

determine a second relative distance $d_{4u}-d_{3u}$ based on the second base offset and the second delay in response if the second delay in response is more than zero, wherein the second relative distance $d_{4u}-d_{3u}$, is a difference between distances from the wireless device to each network node in the second pair; and determine the position of the wireless device based on the first and second relative distances $d_{2u}-d_{1u}$, $d_{4u}-d_{3u}$.

6. The positioning node according to claim 5, further configured to:

determine the position which is consistent with both the first and second relative distances $d_{2u}-d_{1u}$, $d_{4u}-d_{3u}$.

7. The positioning node according to claim 5, further configured to:

obtain a minimum number of TDOAs to be measured and a rate of measuring the TDOAs for each sequence of TDOAs, from one of the network nodes which is serving the wireless device.

8. The positioning node according to claim 5, further configured to obtain the first and second sequences of TDOAs by receiving the first and second sequences of TDOAs from the wireless device.

* * * * *